US012198495B2

(12) United States Patent
Uranic

(10) Patent No.: US 12,198,495 B2
(45) Date of Patent: Jan. 14, 2025

(54) ELECTRONIC GAMING CONTROLLING SYSTEM

(71) Applicant: ADLINK Technology Inc., Taoyuan (TW)

(72) Inventor: Erwin Uranic, Gunskirchen (AT)

(73) Assignee: ADLINK Technology Inc., Taoyuan (TW)

( * ) Notice: Subject to any disclaimer, the term of this patent is extended or adjusted under 35 U.S.C. 154(b) by 285 days.

(21) Appl. No.: 17/865,196

(22) Filed: Jul. 14, 2022

(65) Prior Publication Data

US 2024/0021045 A1 Jan. 18, 2024

(51) Int. Cl.
*G07F 17/32* (2006.01)

(52) U.S. Cl.
CPC ...... *G07F 17/3225* (2013.01); *G07F 17/3223* (2013.01)

(58) Field of Classification Search
CPC .......................... G07F 17/3225; G07F 17/3223
See application file for complete search history.

(56) References Cited

U.S. PATENT DOCUMENTS

2006/0046819 A1* 3/2006 Nguyen ................ G07F 17/323 463/16
2007/0243934 A1 10/2007 Little et al.
2016/0110953 A1* 4/2016 Sotiriou .............. G07F 17/3227 463/25
2022/0148384 A1* 5/2022 McPhail ............. G07F 17/3272

OTHER PUBLICATIONS

European Search Report dated Nov. 8, 2023 for European Patent Application No. 23168846.6.

* cited by examiner

*Primary Examiner* — Werner G Garner

(57) ABSTRACT

An electronic gaming controlling system includes a hardware controlling module, a message bus, a gaming hardware interface and a game application. The hardware controlling module is configured to generate a hardware event message according to a hardware event of an input hardware and publish the hardware event message. The hardware event message is JSON formatted message. The message bus is configured to receive and transfer the hardware event message. The gaming hardware interface is configured to receive the hardware event message from the message bus and generate a hardware command according to the hardware event message. The game application is configured for executing a game and visualizing the game on a screen. The game application generates an event response according to the hardware command and visualizes the event response on the screen.

11 Claims, 2 Drawing Sheets

ELECTRONIC GAMING CONTROLLING SYSTEM

BACKGROUND OF THE INVENTION

1. Field of the Invention

The present invention relates to a controlling system, especially to an electronic gaming controlling system capable of exchanging data among devices with simplified and uniform formatted message.

2. Description of the Prior Art

Over the years, the electronic game has gained in popularity. In the casino sector, the slot gaming is one of the common electronic games. The player inserts the coin and press the start button to start the slot game, and the lamp of the slot gaming device blinks if the player wins the slot game.

In general, the slot gaming device includes a plurality of game hardware devices (such as button, lamp, battery, power switch . . . ) and peripheral hardware devices (such as coin acceptor, coin hopper, note accepter, ticket printer . . . ) to control the game. However, the DLL (Dynamic-Link Library) or the drivers of the game hardware devices and the peripheral hardware devices are different from each other, so that the system programmer must deal with all hardware and all related details, which demanded a very high knowledge of all the hardware. Furthermore, different formats of code for different hardware devices are required to control the game in the prior art, thereby decreasing the efficiency and increasing the costs.

Moreover, since the real money are used as the coins for the slot gaming devices in casinos, it will cause great loss if the hacker hacks the system of the slot gaming device to falsify the game parameter and code or if someone breaks the maintenance door to steal the coins.

SUMMARY OF THE INVENTION

Therefore, the present invention provides an electronic gaming controlling system including a hardware controlling module, a message bus, a gaming hardware interface and a game application. The hardware controlling module is connected to at least one input hardware. The hardware controlling module generates a hardware event message according to a hardware event of the input hardware and publishes the hardware event message. The hardware event message is JSON (JavaScript Object Notation) formatted message. The message bus is coupled to the hardware controlling module and receives and transfer the hardware event message. The gaming hardware interface is coupled to the message bus. The gaming hardware interface receives the hardware event message from the message bus and generates a hardware command. The game application is coupled to the gaming hardware interface, executes a game and visualizes the game on a screen. The game application generates an event response of the game according to the hardware command and visualizes the event response on the screen.

Wherein, the electronic gaming controlling system further includes a RESTful interface coupled to the game application and the gaming hardware interface, and includes at least one output hardware connected to the hardware controlling module. The game application generates a game event message and sends the game event message to the RESTful interface. The gaming hardware interface receives the game event message and publishes the game event message to the message bus. The hardware controlling module receives the game event message to control the output hardware. The game event message is JSON formatted message.

Wherein, the gaming hardware interface provides a keyboard service to generate a virtual keyboard event with the hardware command, and the game application processes the virtual keyboard event directly to generate the event response.

Wherein, the hardware controlling module includes a hardware abstraction layer (HAL). The hardware controlling module polls the input hardware by the HAL to receive the hardware event of the input hardware, and the HAL controls the output hardware according to the game event message.

Wherein, the hardware controlling module is integrated in a controller. The message bus, the gaming hardware interface, the game application and the RESTful interface are executed by a processor.

Wherein, the electronic gaming controlling system further includes an accounting backend server coupled to the message bus and the RESTful interface and configured for storing accounting data. The accounting backend sever receives the hardware event message to generate a new accounting data for updating the accounting data. The accounting backend server generates an updated accounting data message according to the updated accounting data and publishes the updated accounting data message to the message bus and the RESTful interface.

Wherein, the electronic gaming controlling system further includes an accounting backend GUI coupled to the RESTful interface. The accounting backend GUI receives the updated accounting data message from the RESTful interface and displays the updated accounting data.

Wherein, the electronic gaming controlling system further includes a game server coupled to the message bus and the RESTful interface. The game server receives the updated accounting data message from the message bus to generate updated accounting data. The game server publishes the updated accounting data to the RESTful interface, and the game application receives the updated accounting data and visualizes the updated accounting data on the screen.

Wherein, the electronic gaming controlling system further includes a SAS library (slot accounting system library) coupled to the accounting backend server. The SAS library receives the updated accounting data generated by the accounting backend server, of which accounting data shall be also complied with certain standards in gaming industry.

Wherein, the hardware controlling module generates an intrusion event message according to an intrusion event of the input hardware and publishes the intrusion event message to the message bus. The accounting backend server receives the intrusion event message from the message bus.

Wherein, the accounting backend server generates a warning command according to the intrusion event message and sends the warning command to the game application using a virtual keyboard event. The game application generates a warning message according to the warning command and visualizes the warning message on the screen.

Wherein, the accounting backend server records and updates an intrusion event count according to the intrusion event message and publishes the intrusion event count to the RESTful interface.

Wherein, the electronic gaming controlling system further includes an encryption unit coupled to the hardware controlling module. The encryption unit encrypts the hardware event message before the hardware controlling module publishing the hardware event message.

In summary, the electronic gaming controlling system of the present invention can control the game hardware, the peripheral hardware and the software application through the simplified and uniformed message of the message bus and the RESTful interface, thereby increasing the controlling efficiency. Furthermore, the electronic gaming controlling system of the present invention can copy and store the message to additional storage, so that the game programmer and the system programmer can debug the message and the whole system can keep running, thereby increasing the efficiency and reducing maintenance costs. Moreover, the electronic gaming controlling system of the present invention can exchange data among a plurality of devices through the message bus and the RESTful interface via publish and subscribe mechanism, thereby increasing the controlling efficiency. Furthermore, the electronic gaming controlling system of the present invention can protect the message and system by encryption unit and intrusion event detection, thereby increasing data security. In addition, the data of each of devices can be exchanged with the same format, so that the game programmer and the system programmer need no internal system-knowledge anymore and can concentrate on developing the logic architecture, thereby increasing the efficiency and reducing the costs.

BRIEF DESCRIPTION OF THE APPENDED DRAWINGS

DETAILED DESCRIPTION OF THE INVENTION

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the vertical direction, horizontal direction and devices in the figures are only used to express their corresponding positions and are not drawing according to their actual proportion.

Figure 1:
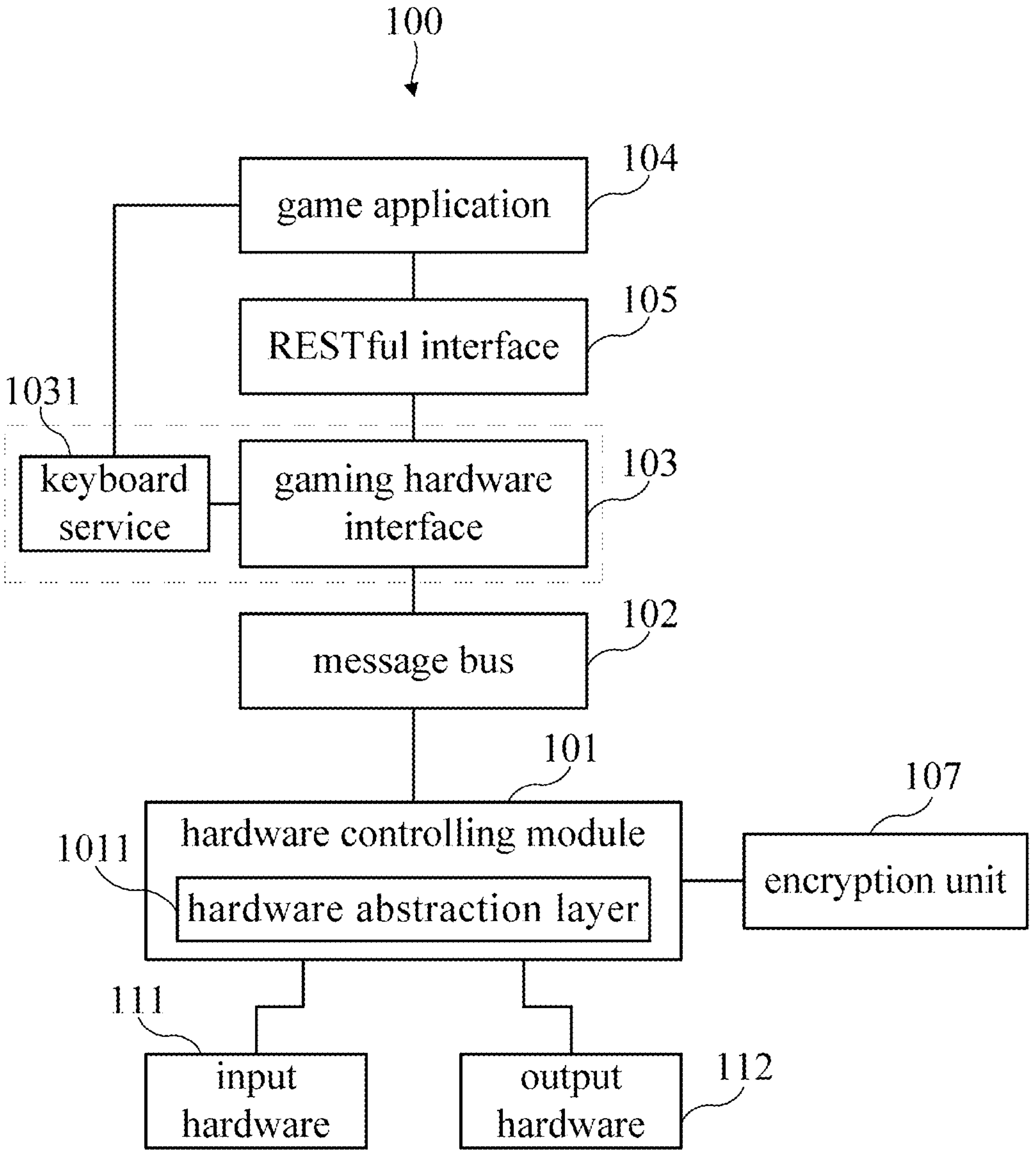
FIG. 1 is a function block diagram illustrating an electronic gaming controlling system in an embodiment of the present invention.

Please refer to FIG. 1. FIG. 1 is a function block diagram illustrating an electronic gaming controlling system 100 in an embodiment of the present invention. As shown in FIG. 1, in this embodiment, the electronic gaming controlling system 100 includes a hardware controlling module 101, a message bus 102, a gaming hardware interface 103 and a game application 104. The hardware controlling module 101 is connected to at least one input hardware 111. The hardware controlling module 101 generates a hardware event message according to a hardware event of the input hardware 111 and publishes the hardware event message. The message bus 102 is coupled to the hardware controlling module 101 and receives and transfers the hardware event message published by the hardware controlling module 101. The gaming hardware interface 103 is coupled to the message bus. The gaming hardware interface 103 receives the hardware event message from the message bus 102 to generate a hardware command. The game application 104 is coupled to the gaming hardware interface 103, executes a game and visualizes the game on a screen. The game application 104 generates an event response according to the hardware command and visualizes the event response on the screen.

In this embodiment, the hardware controlling module 101 is configured to execute a hardware abstraction service (HWS). In practice, the hardware controlling module 101 includes a hardware interface, and the hardware controlling module 101 can be connected to the input hardware 111 and output hardware 112 through the hardware interface with SPI, TCP/IP, I2C or RS232. In FIG. 1, the electronic gaming controlling system 100 only includes one input hardware 111 and one output hardware 112. In practice, the electronic gaming controlling system 100 can include a plurality of the input hardware 111 and output hardware 112 connected to the hardware controlling module 101 through the plurality hardware interfaces respectively. In practice, the input hardware 111 can be a button (digital in), and the output hardware 112 can be a lamp (digital out). Furthermore, the input hardware 111 and the output hardware 112 can also be hardware counters, one wire devices, user-LEDs, dip-switches, power, batteries and so on. Moreover, the hardware controlling module 101 includes the hardware abstraction layer (HAL) 1011 for polling or interrupting the input hardware 111 to generate the hardware event message corresponding to the hardware event. It should be noted that the HAL is not limited to poll or interrupt the input hardware to generate the hardware event message of the present invention. In practice, when the HAL 1011 detects that the input hardware 111 generates the digital input signal, the HAL 1011 determines that the hardware event of the input hardware 111 occurs. Then, the HAL 1011 receives the changed digital input signal and the hardware controlling module 101 generates the hardware event message. In this embodiment, the hardware event message generated by the hardware controlling module 101 is, but not limited to, a code in JSON (JavaScript Object Notation) format. In practice, the hardware event message can also be extensible markup language (XML) formatted message.

The message bus 102 can be a message-broker, a message queuing telemetry transport (MQTT), a data distribution service (DDS) and so on. Furthermore, the message bus 102 can generate data flow, so that the message bus 102 can transfer the data of message, code and signal. In practice, the hardware controlling module 101 can connect to the message bus 102 to exchange the data to each other via JSON protocol or XML protocol. That is to say, the hardware controlling module 101 can publish the message to the data flow of the message bus 102, and the message bus 102 can also send back a message in the data flow to the hardware controlling module 101 (the hardware controlling module 101 is publisher and subscriber to the message bus 102).

The gaming hardware interface 103 can transmit data between the software application (game) and the hardware devices (such as input hardware 111). In practice, the gaming hardware interface 103 includes a code library or code database and subscribes the message bus 102. When the hardware controlling module 101 publishes the hardware event message to the message bus 102, the gaming hardware interface 103 can receive the hardware event message from the message bus 102 and generate the hardware command, and send the hardware command to the game application 104.

The game application 104 can be connected to the gaming hardware interface 103 directly. When receiving the hardware command from the gaming hardware interface 103, the game application 104 generates the event response of the game and visualizes the event response on the screen. In practice, when the game application 104 visualizes the game on the screen, the screen can display the game image, graphical animations of the game, and game information.

In practice, the electronic gaming controlling system 100 can include a processor (such as CPU) and a hardware controller connected to the processor, and the processor and the hardware controller can be integrated on a circuit board. Furthermore, the processor can execute the message bus 102, the gaming hardware interface 103 and the game application 104, and the hardware controlling module 101 can be integrated in the hardware controller. Therefore, the electronic gaming controlling system 100 can reflect the actual action of the input hardware 111 into the visualization of the game through the processor and the hardware controller.

In addition to the above-embodiment, the executing unit of the electronic gaming controlling system can also be other types. In one embodiment, the electronic gaming controlling system only includes one processor. The hardware controlling module 101 is integrated in the processor, and the processor executes the message bus 102, the gaming hardware interface 103 and the game application 104. In another one embodiment, the electronic gaming controlling system includes a plurality of processors. The hardware controlling module 101 is integrated in one processor, and the message bus 102, the gaming hardware interface 103 and the game application 104 are executed by different processors respectively.

The electronic gaming controlling system 100 of the present invention can be applied to slot gaming devices or casino devices, but it is not limited thereto. In practice, the input hardware 111 can be a start button of the slot gaming device. When the user presses the start button, the HAL 1011 detects and receives the digital input signal to determine that a game start event (hardware event) occurs, and the hardware controlling module 101 will create the game start message (hardware event message) and publish the game start message to the message bus 102. Then, the message bus 102 will receive the game start message and transfers the game start message to the gaming hardware interface 103.

In this embodiment, the gaming hardware interface 103 further provides a keyboard service 1031. In practice, when the gaming hardware interface 103 receives a game start message, the gaming hardware interface 103 will generate a virtual keyboard event with the hardware command, and the game application 104 can process the virtual keyboard event directly to generate the event response on the screen and start the game. Therefore, the reaction time between the user pressing the start button and seeing the game starting will be very fast. Moreover, the electronic gaming controlling system of the present invention can control the software application through the input hardware.

As shown in FIG. 1, in this embodiment, the electronic gaming controlling system 100 further includes a RESTful interface 105. The RESTful interface 105 is coupled to the game application 104 and the gaming hardware interface 103. In practice, the RESTful interface 105 can also be executed by the aforementioned processor and generate data flow. In another one embodiment, the RESTful interface can also be executed by another processor different from the aforementioned processor. The game application 104 and the gaming hardware interface 103 can change message and command with each other through the RESTful interface 105. It should be noted that both of the message, code and signal transferred in the RESTful interface 105 and the message bus 102 can be JSON formatted messages.

In practice, the output hardware 112 can be a lamp of the slot gaming device. When a game event occurs (such as a win or big win has been granted in the game), the game application 104 generates a game event message for blinking the lamp and publishes the game event message to the RESTful interface 105. The code of game event message can include the text of "lamp", the blink time and blink mode. Then, the gaming hardware interface 103 will receive the game event message from the RESTful interface 105 and publish the game event message to the message bus 102. When the hardware controlling module 101 receives the game event message, the hardware controlling module 101 will process the game event message through DLL to generate a game command, and then the HAL 1011 will control the lamp to blink according to the game command. Therefore, the electronic gaming controlling system of the present invention can control the output hardware through the software application.

In practice, the message bus further can include an IP address. If the IP address of the message bus is available and reachable through firewalls, the game programmer and the system programmer can connect to the message bus, and the message bus allows the game programmer and the system programmer to implement, test and debug while the whole system keeps running.

In this embodiment, the electronic gaming controlling system 100 further includes an encryption unit 107 connected to the hardware controlling module 101. In practice, the encryption unit 107 can be a crypto chip for encrypting the message in secure socket layer (SSL) protocol. When the hardware controlling module 101 generates the hardware event message of the hardware event, the encryption unit 107 SSL encrypts the hardware event message first, and then the hardware controlling module 101 publishes the encrypted hardware event message to the message bus 102. Therefore, it is hard for the hacker to recognize or indentify the hardware event message, thereby increasing data security. It should be noted that the subscriber (gaming hardware interface 103) of the message bus 102 can also include a decryption unit or be connected to a decryption unit. When the subscriber receives the encrypted hardware event message from the message bus 102, the subscriber can decrypt the encrypted hardware event message first to obtain and process the hardware event message. Moreover, the encryption unit can also be integrated in the aforementioned processor, or can be integrated in another processor.

Figure 2:
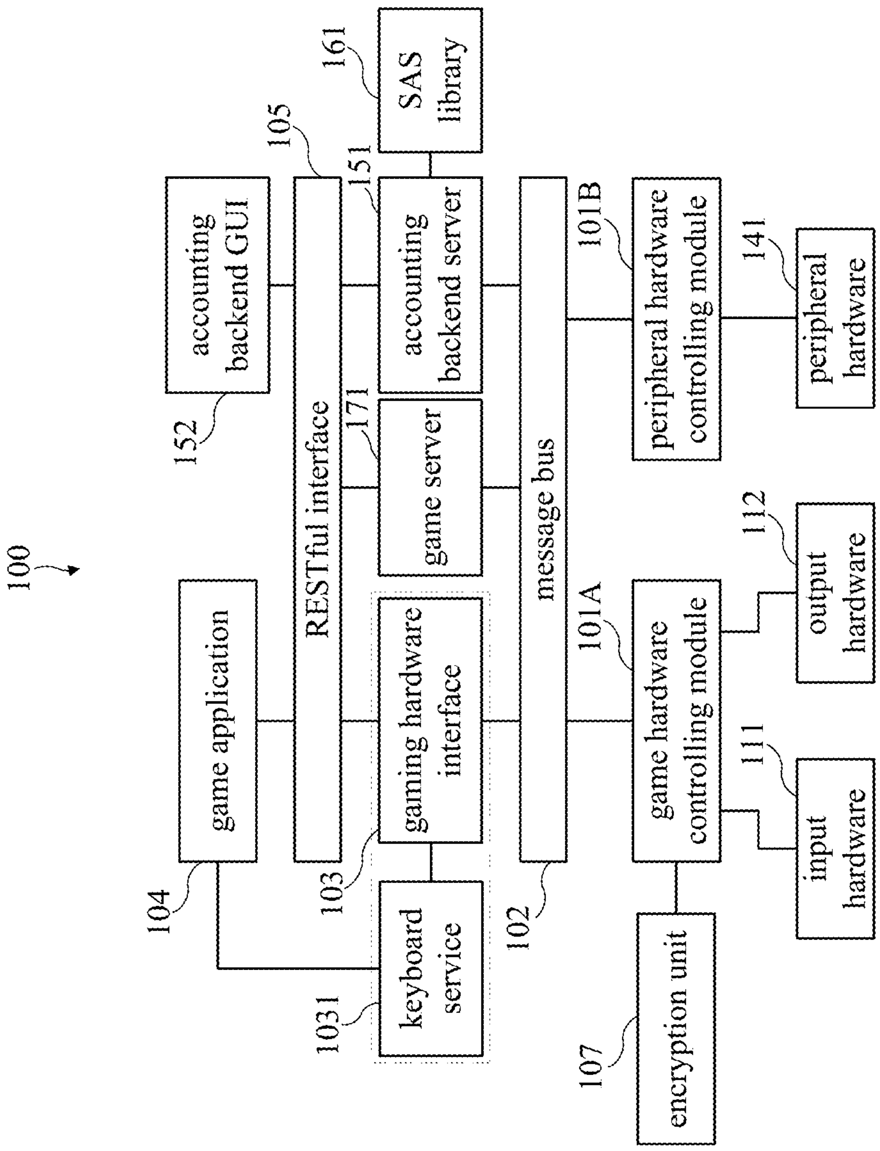
FIG. 2 is a function block diagram illustrating the electronic gaming controlling system in another embodiment of the present invention.

Please refer to FIG. 2. FIG. 2 is a function block diagram illustrating the electronic gaming controlling system 100 in another embodiment of the present invention. As shown in FIG. 2, in this embodiment, the electronic gaming controlling system 100 further includes an accounting backend server 151, and the accounting backend server 151 is coupled to the message bus 102 and the RESTful interface 105 and configured for storing and processing accounting data. Moreover, the hardware controlling module 101 further includes a game hardware controlling module 101A and a peripheral hardware controlling module 101B. The game hardware controlling module 101A is connected to the input hardware 111 and the output hardware 112, and the peripheral hardware controlling module 101B is connected to at least one peripheral hardware 141.

In practice, the game hardware controlling module 101A can provide the hardware abstraction service (HWS), and the peripheral hardware controlling module 101B can provide the device abstraction service (DAS). Moreover, the accounting backend server 151 can provide an accounting backend service to process accounting data, subscribe to the message bus 102 and provide a RESTful interface 105, and exchange data via JSON protocol or XML protocol. The accounting data can be credit data, coin data, jackpot amount data, bonus amount data and so on. The game hardware controlling module 101A and the peripheral hardware controlling module 101B can also include HAL respectively (not shown in figure). The functions of the HAL of the game hardware controlling module 101A and the peripheral hardware controlling module 101B are the same as the function of the HAL of aforementioned embodiment, it will not describe hereto. In FIG. 2, the electronic gaming controlling system 100 only includes one peripheral hardware 141. In practice, the electronic gaming controlling system 100 can include a plurality of the peripheral hardware 141 connected to the peripheral hardware controlling module 101B. In practice, the peripheral hardware 141 can be a coin acceptor, a coin hopper, a note acceptor, a ticket printer and so on. Moreover, the game hardware controlling module 101A and the peripheral hardware controlling module 101B can also be integrated in different controller respectively.

When the user inserts a coin, the HAL of the peripheral hardware controlling module 101B detects and receives the digital input signal to determine that a coin-in event (hardware event) occurs. Then, the peripheral hardware controlling module 101B will create the coin-in event message (hardware event message) and publish the coin-in event message to the message bus 102. At this time, the message bus 102 sends the coin-in event message to the gaming hardware interface 103 and the accounting backend server 151 as well. When the accounting backend server 151 receives the coin-in event message from the message bus 102, the accounting backend server 151 can process new accounting data according to the coin-in event message and updates the total accounting data. Similarly, the accounting backend server 151 can also generate and publish the updated accounting data message corresponding to the updated accounting data to the message bus 102 and the RESTful interface 105, and the updated accounting data message can be the JSON formatted message.

In this embodiment, the electronic gaming controlling system 100 further includes an accounting backend GUI 152 coupled to the RESTful interface 105. In practice, the accounting backend GUI 152 can be executed by a backend computer and can display the accounting data image on the screen of the backend computer. When the game manager or programmer needs to check the updated accounting data, the game manager or programmer can send a request through the accounting backend GUI 152, and then the accounting backend GUI 152 will receive the updated accounting data message from the RESTful interface 105 and display the updated accounting data on the screen of the backend computer. Therefore, the electronic gaming controlling system of the present invention can exchange data among a plurality of devices through the message bus and the RESTful interface via publish and subscribe mechanism, thereby increasing the controlling efficiency. Furthermore, the data of each of devices can be exchanged with the same format, so that the game programmer and the system programmer need no internal system-knowledge anymore and can concentrate on developing the logic architecture, thereby increasing the efficiency and reducing the costs.

In this embodiment, the electronic gaming controlling system 100 further includes a SAS library 161 (slot accounting system library) connected to the accounting backend server 151. In practice, the SAS library 161 can generate an accounting data report and allow the electronic gaming machine (EGM) to communicate or process events (such as accounting data, ticket redemption and validation, advanced funds transfer (AFT), electronic funds transfer (EFT), and progressive data) to a host system. The host system can be a computer of a validation institution. When the accounting backend server 151 generates the new accounting data according to the coin-in event message, the SAS library 161 can store the new accounting data in the accounting data report for certification. In practice, the accounting data and credit data shall be also complied with certain standards in gaming industry. Furthermore, SAS library 161 provides a storing callback mechanism for the updated accounting data. It should be noted that the SAS library 161 can be executed by the aforementioned processor to send the accounting data report to the validation institution.

In this embodiment, the electronic gaming controlling system 100 further includes a game server 171 coupled to the message bus 12 and the RESTful interface 105. In practice, the game server 171 can be a remote game server (RGS) and can also provide a RESTful interface 105. When the accounting backend server 151 generates and publishes the updated accounting data message to the message bus 12, the game server 171 can receive the updated accounting data message and generate an updated credit resource. Then, the game server 171 publishes the updated credit resource message to the RESTful interface 105. Furthermore, the game application 104 can receive the updated credit resource message to generate and display the updated credit resource on the game image of the screen. In practice, the game server 171 can be an independent hardware/device. In one embodiment, the game server can be a microservice controlled and executed by the aforementioned processor.

In one embodiment, the input hardware 111 further can include an intrusion-monitoring device. In practice, the intrusion-monitoring device can be a sensor. When the maintenance door is opened by others instead of the system programmer, the sensor will generate an intrusion signal. Then, the HAL 1011 determines that a door-open event (intrusion event) occurs according to the intrusion signal, and the hardware controlling module 101 generates and publishes the door-open event message to the message bus 102. At this time, the accounting backend server 151 can receive the door-open event message from the message bus 102 and generate a warning command and an intrusion event count. In addition, the accounting backend server 151 can pre-store an intrusion event count list, and the accounting backend server 151 can record and update the intrusion event count of the intrusion event count list.

Furthermore, the gaming hardware interface 103 can receive the warning command from the message bus 102 and generate a virtual keyboard event with a predefined warning key, and the game application 104 can process the virtual keyboard event directly to generate and display the warning message on the game image of the screen. In practice, the warning message can be at least one of light, text and sound. In one embodiment, the accounting backend server 151 can also publish the warning command and the intrusion event count to the RESTful interface 105. The accounting backend GUI 152 can receive the intrusion event count from the RESTful interface 105 to record the intrusion event count, and receive the warning command to generate and display the warning message on the screen of the backend computer, to remind the game manager and system programmer. In another one embodiment, SAS library 161 can further generate an exception report. When the accounting backend server 151 generates the intrusion event count, the SAS library 161 can provide the intrusion event count in the exception report for recording the exception event of the game.

In summary, the electronic gaming controlling system of the present invention can control the game hardware, the peripheral hardware and the software application through the simplified and uniformed message of the message bus and the RESTful interface, thereby increasing the controlling efficiency. Furthermore, the electronic gaming controlling system of the present invention can copy and store the message to additional storage, so that the game programmer and the system programmer can debug the message and the whole system can keep running, thereby increasing the efficiency and reducing maintenance costs. Moreover, the electronic gaming controlling system of the present invention can exchange data among a plurality of devices through the message bus and the RESTful interface via publish and subscribe mechanism, thereby increasing the controlling efficiency. Furthermore, the electronic gaming controlling system of the present invention can protect the message and system by encryption unit and intrusion event detection, thereby increasing data security. In addition, the data of each of devices can be exchanged with the same format, so that the game programmer and the system programmer need no internal system-knowledge anymore and can concentrate on developing the logic architecture, thereby increasing the efficiency and reducing the costs.

With the examples and explanations mentioned above, the features and spirits of the invention are hopefully well described. More importantly, the present invention is not limited to the embodiment described herein. Those skilled in the art will readily observe that numerous modifications and alterations of the device can be made while retaining the teachings of the invention. Accordingly, the above disclosure should be construed as limited only by the metes and bounds of the appended claims.

What is claimed is:

1. An electronic gaming controlling system, comprising:

a hardware controlling module, connected to at least one input hardware, the hardware controlling module being configured to generate a hardware event message according to a hardware event of the input hardware and publish the hardware event message, wherein the hardware event message is a JSON (JavaScript Object Notation) formatted message, and the hardware controlling module generates an intrusion event message according to an intrusion event of the input hardware;

a message bus, coupled to the hardware controlling module, the message bus being configured to receive and transfer the hardware event message, and to receive the intrusion event message;

an accounting backend server, coupled to the message bus for storing accounting data, wherein the accounting backend server receives the intrusion event message from the message bus;

a gaming hardware interface, coupled to the message bus, the gaming hardware interface being configured to receive the hardware event message from the message bus and generate a hardware command according to the hardware event message;

a game application, coupled to the gaming hardware interface and configured for executing a game and visualizing the game on a screen, the game application generating an event response of the game according to the hardware command and visualizing the event response on the screen;

a RESTful interface, coupled to the game application and the gaming hardware interface; and at least one output hardware, connected to the hardware controlling module;

wherein, the game application is configured to generate a game event message according to a game event of the game and send the game event message to the RESTful interface, the gaming hardware interface receives the game event message and publishes the game event message to the message bus, the hardware controlling module receives the game event message and controls the output hardware according to the game event message, the game event message is JSON formatted message.

2. The electronic gaming controlling system of claim 1, wherein the gaming hardware interface generates a virtual keyboard event with the hardware command, and the game application processes the virtual keyboard event directly to generate the event response.

3. The electronic gaming controlling system of claim 1, wherein the hardware controlling module comprises a hardware abstraction layer (HAL), the hardware controlling module is configured for polling or interrupting the input hardware by the HAL to receive the hardware event of the input hardware, and the HAL is configured to control the output hardware according to the game event message.

4. The electronic gaming controlling system of claim 1, wherein the hardware controlling module is integrated in a controller; the message bus, the gaming hardware interface, the game application and the RESTful interface are executed by a processor.

5. The electronic gaming controlling system of claim 1, wherein the accounting backend server is coupled to the RESTful interface, the accounting backend sever is configured to receive the hardware event message and generate a new accounting data according to the hardware event message, and to update the accounting data according to the new accounting data, and the accounting backend server generating an updated accounting data message according to the updated accounting data and publishing the updated accounting data message to the message bus and the RESTful interface.

6. The electronic gaming controlling system of claim 5, further comprising an accounting backend GUI coupled to the RESTful interface, the accounting backend GUI being configured to receive the updated accounting data message from the RESTful interface and display the updated accounting data.

7. The electronic gaming controlling system of claim 5, further comprising a game server coupled to the message bus and the RESTful interface, the game server receiving the updated accounting data message from the message bus and generating an updated accounting data according to the updated accounting data message, the game server publishing the updated accounting data to the RESTful interface, and the game application receiving the updated accounting data and visualizing the updated accounting data on the screen.

8. The electronic gaming controlling system of claim 5, further comprising an SAS library (slot accounting system library) coupled to the accounting backend server, the SAS library being configured to receive the updated accounting data generated by the accounting backend as demanded for certification.

9. The electronic gaming controlling system of claim 1, wherein the accounting backend server generates a warning command according to the intrusion event message and sends the warning command to the game application by a virtual keyboard event, and the game application generates a warning message according to the warning command and visualizes the warning message on the screen.

10. The electronic gaming controlling system of claim 1, wherein the accounting backend server records and updates an intrusion event count according to the intrusion event message and publishes the intrusion event count to the RESTful interface.

11. The electronic gaming controlling system of claim 1, further comprising an encryption unit coupled to the hardware controlling module, the encryption unit being configured to encrypt the hardware event message before the hardware controlling module publishing the hardware event message.

* * * * *